United States Patent [19]

Pollacco

[11] Patent Number: 4,533,042
[45] Date of Patent: * Aug. 6, 1985

[54] MOTOR OIL CHANGE KIT AND CATCH PAN FOR USE IN CHANGING AUTOMOTIVE MOTOR OIL

[76] Inventor: William F. Pollacco, 3819 Burlingame Pl., Alexandria, Va. 22309

[*] Notice: The portion of the term of this patent subsequent to Sep. 13, 2000 has been disclaimed.

[21] Appl. No.: 501,625

[22] Filed: Jul. 29, 1983

Related U.S. Application Data

[63] Continuation of Ser. No. 297,082, Aug. 27, 1981, Pat. No. 4,403,692.

[51] Int. Cl.³ ............... B65B 39/00; B65D 81/36; F16N 31/00
[52] U.S. Cl. ............................... 206/223; 141/98; 141/326; 141/364; 184/1.5; 184/106; 220/1 C; 220/212; 220/410
[58] Field of Search ............... 141/98, 311 R, 326, 141/327, 337–340, 364, 379, 380, 381; 184/1.5, 106; 215/6; 220/1 C, 408, 410, 411, 288; 206/223, 514, 577

[56] References Cited

U.S. PATENT DOCUMENTS

| | | | |
|---|---|---|---|
| 225,755 | 3/1880 | Keene | 141/340 |
| 385,256 | 6/1888 | Eggers | 220/288 |
| 512,109 | 1/1894 | Hinman | 220/408 |
| 949,074 | 2/1910 | Hickox | 141/381 |
| 1,320,649 | 11/1919 | Pound | 141/337 |
| 2,575,770 | 11/1951 | Roop | 206/514 |
| 3,012,660 | 12/1961 | Sheldon, Jr. | 206/597 |
| 3,169,605 | 2/1965 | Ashmead | 184/106 |
| 3,233,817 | 2/1966 | Casady | 220/411 |
| 3,410,438 | 11/1968 | Bartz | 220/1 C |
| 3,483,041 | 12/1969 | Kalen | 206/223 |
| 3,658,204 | 4/1972 | Bottger | 215/6 |
| 3,703,956 | 11/1972 | Oswalt | 206/223 |
| 4,022,257 | 5/1977 | O'Connell | 184/106 |
| 4,054,184 | 10/1977 | Marcinko | 184/106 |
| 4,064,969 | 12/1977 | Black | 184/1.5 |
| 4,098,398 | 7/1978 | Meyers | 206/223 |
| 4,099,598 | 7/1978 | Clinard | 184/106 |
| 4,114,660 | 9/1978 | Arruda | 141/339 |
| 4,162,020 | 7/1979 | Kirkland | 220/1 C |
| 4,262,710 | 4/1981 | Nomura et al. | 141/98 |
| 4,296,838 | 10/1981 | Cohen | 220/1 C |
| 4,408,642 | 10/1983 | Jeruzal et al. | 184/106 |

FOREIGN PATENT DOCUMENTS

| | | | |
|---|---|---|---|
| 2370208 | 7/1978 | France | 184/1.5 |
| 1416096 | 12/1975 | United Kingdom | 206/223 |

*Primary Examiner*—George E. Lowrance
*Assistant Examiner*—Jimmy G. Foster
*Attorney, Agent, or Firm*—Cushman, Darby & Cushman

[57] ABSTRACT

The present invention provides a motor oil change kit, especially for use by do-it-yourselfers, in which all that is needed for conveniently and cleanly changing the oil may be packaged together in a way that increases the chances that the motorist will not become intimidated by the project, but become habituated to this way of getting the oil changed, and that increases the chances that the motorist will unerringly bring the used oil to an authorized collection facility. Four types of kit are shown, each with its own advantages, but with many features in common. Each provides a closeable container of new oil, a collector for used oil, and a convenient system for either closing the container used for collecting the used oil, or for transferring the used oil from the collector to the emptied closeable container in which the new oil had been contained.

15 Claims, 11 Drawing Figures

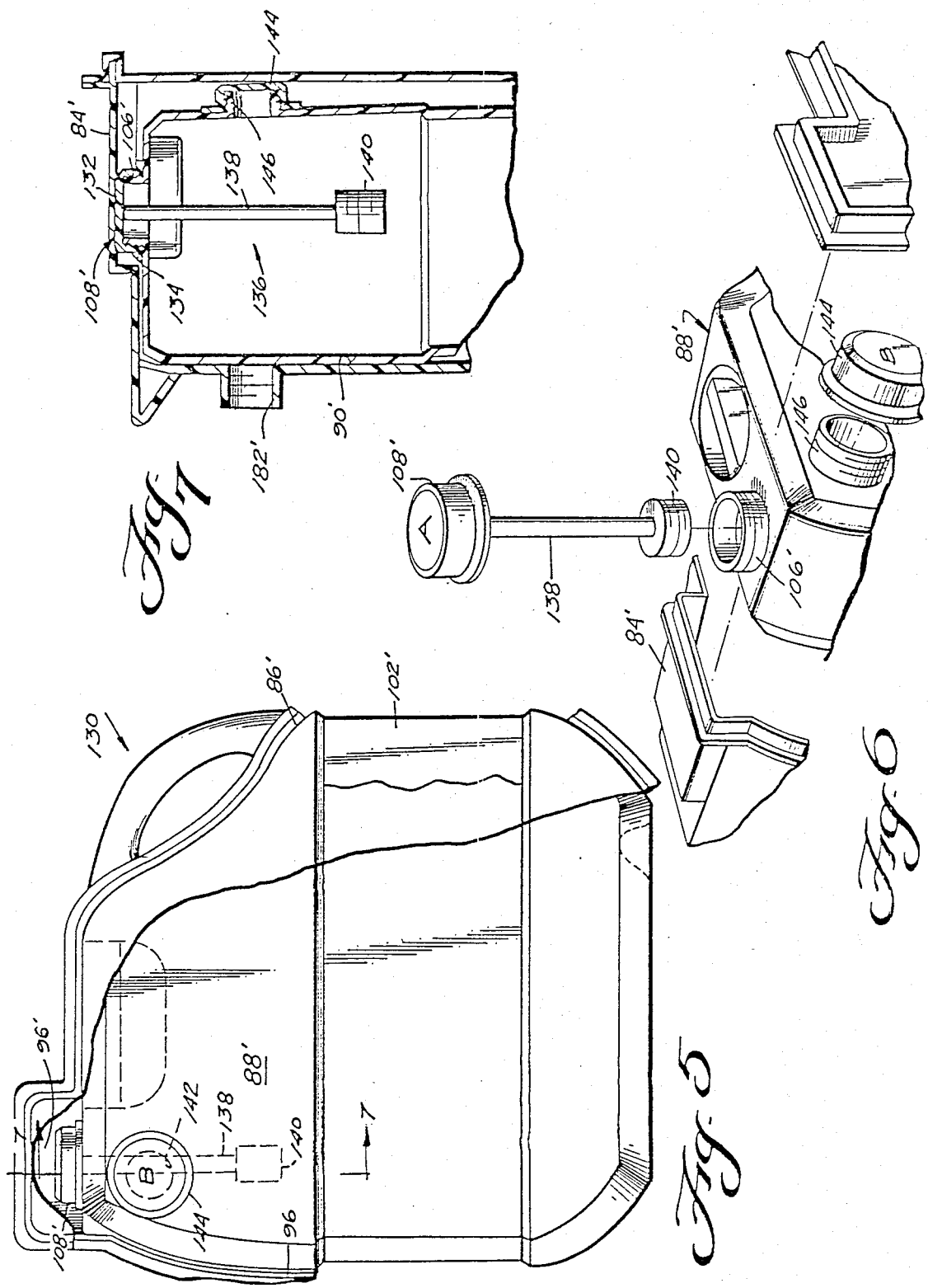

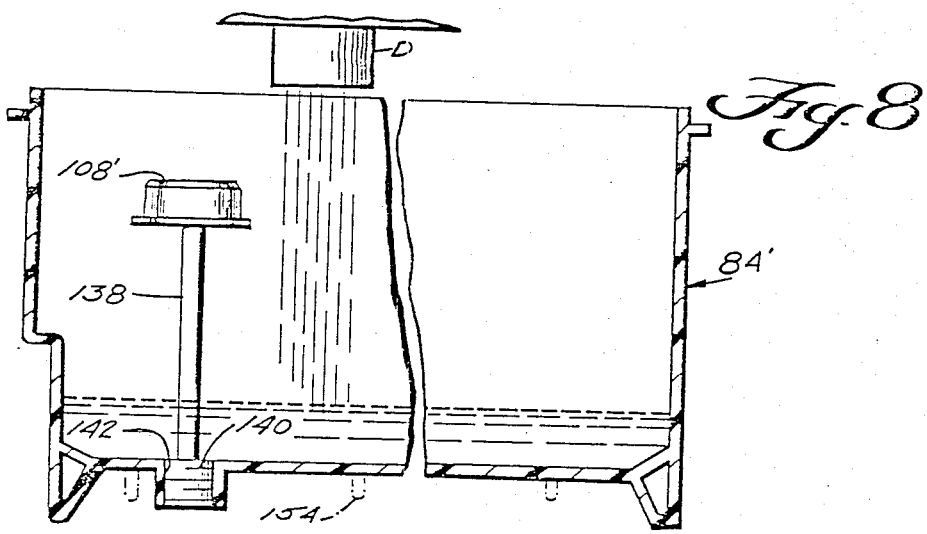
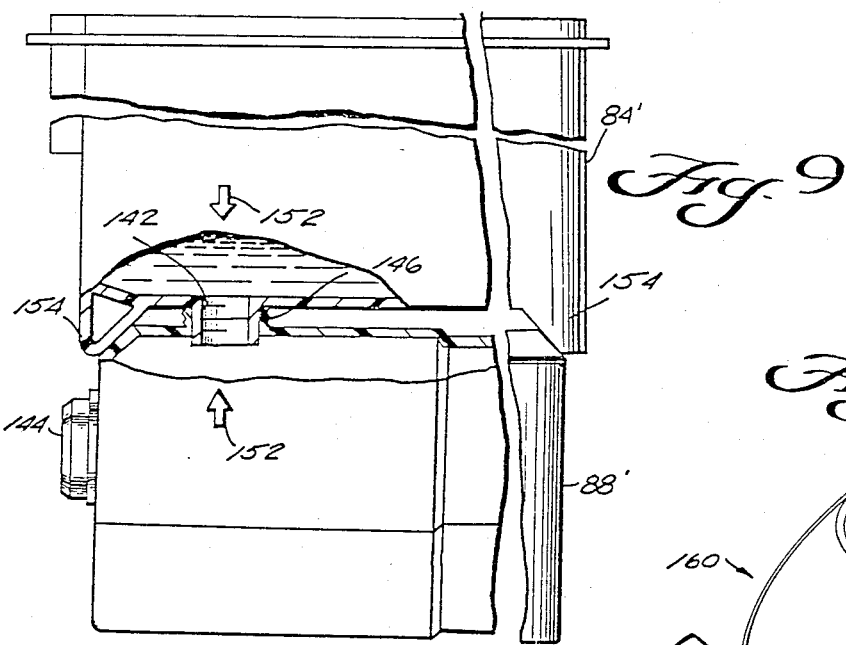
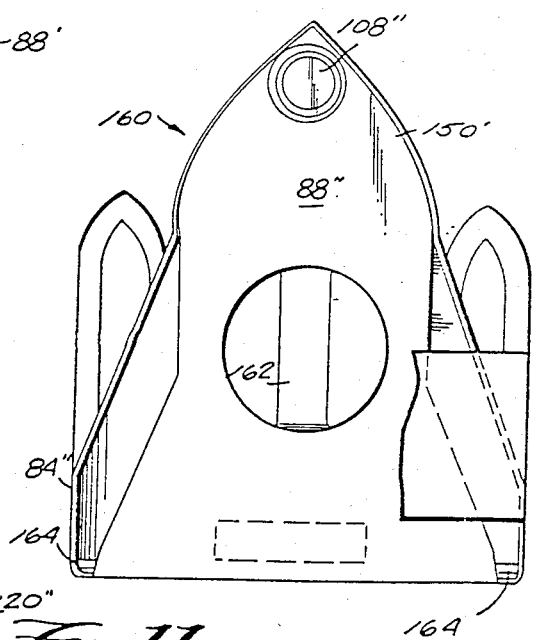
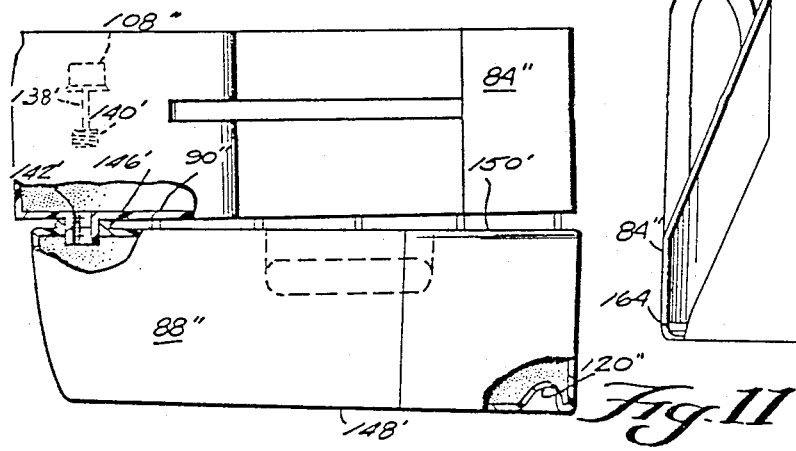

MOTOR OIL CHANGE KIT AND CATCH PAN FOR USE IN CHANGING AUTOMOTIVE MOTOR OIL

This is a continuation of application Ser. No. 297,082, filed Aug. 27, 1981 U.S. Pat. No. 4,403,692.

BACKGROUND OF THE INVENTION

As costs associated with operating and maintaining an automobile have risen, and as many former neighborhood gas stations have closed or converted to "gas-and-go" stations which do not offer automobile servicing, more motorists have experimented with, or switched over to changing their own automotive motor oil.

One undesirable consequence of this trend is the loss of a considerable amount of reuseable oil from the petroleum refining and distribution system. Generally, when a car's oil is changed at a service station, the waste oil is saved at the station, from which it is periodically collected by the service station's supplier of new oil, or by an independent reprocesser. The collected waste oil is then re-refined into a useable product. Whereas many service stations have, as a convenience, or under direction by suppliers or governmental authority, established facilities to receive from "do-it-yourselfers" (hereinafter "DIY's") waste oil that is brought to the station. This has largely proved to be inconvenient both to the DIY's and to the dealers and much waste oil never makes it back from the DIY's to these facilities. Rather, it is sewered or run out on the ground, or disposed-of in municipal waste, i.e. put out in an unsegregated manner with the trash for collection and disposition at a landfill. In many urbanized areas casually discarded, used motor oil has become a pollution menace, and the subject of uncharacteristic criminal behavior by otherwise moral and upstanding citizenry.

One problem DIY's have with doing their part in recycling waste oil, is that many automobiles hold 5 to 7 quarts of oil, whereas most empty containers DIY's are likely to have readily available are 4-quart containers. It only takes one time of seeing the last quart of draining dirty oil brim over the container and spill on the garage floor, street or ground to convince a novice DIY that he or she has taken on a project he or she is incompetent to attempt ever again, and is one reason why the oil is dumped illegally.

Another problem DIY's have with such a project is that most conveniently available closeable containers that have a large enough capacity, are too tall to fit under the car at the place where the oil is to be drained from the crankcase. Some DIY's decide upon discovering this problem to abandon the project and take the car to a service station, others move the car to a place (such as over a storm drain) where they can let the waste oil drain out without being collected. A particularly enterprising segment of DIY's devices a multi-step operation in which they first drain the waste oil from the crankcase into a low-sided, broad container such as a dishpan, and then pour it from the dishpan or the like, into a jug that is too tall to have fit under the car, but which has the virtue of being closeable. Some DIY's make the same mistake at this stage as was mentioned earlier: trying to pour 5 to 7 quarts of oil into a 4-quart container. Others cause spillage when they attempt this transfer without the aid of a funnel, or with an inadequate funnel. Besides the mess, this can prove to be expensive, as when the DIY winds-up discarding an expensive polyethylene dishpan after a single use, because it has gotten too messy and did not work well for this purpose, and is another reason why the oil is dumped illegally.

A further problem is that some collecting stations will only permit the deposit of used oil in approved containers, or will only permit the DIY's to deposit used oil by pouring from the brought-in containers, with the understanding that the emptied containers themselves may not be left at the station but must immediately be taken back by the DIY's who brought them.

Government information reveals that illegally dumped dirty motor oil (tens of thousands of barrels daily), constitute the largest single source of pollution of our waterways.

The two reasons most frequently stated by DIY's to the present inventor for their dumping of used motor oil are:

a. Their *inability to find* an empty jug to transfer the dirty oil into from the pan. (A closable jug for receiving and transporting the dirty oil automatically comes with each of the kits of the invention).

b. Their inability and/or difficulty to pour 5 to 7 quarts of dirty oil from a pan having an opening of over 1 foot in diameter, into a jug opening that is only 1 *inch*, in diameter without spilling. With the kit(s) of the invention, the DIY's do not have to *physically* pour the dirty oil from the pan to the jug.

SUMMARY OF THE INVENTION

The present invention provides a motor oil change kit, especially for use by do-it-yourselfers, in which all that is needed for conveniently and cleanly changing the oil may be packaged together in a way that increases the chances that the motorist will not become intimidated by the project, but become habituated to this way of getting the oil changed, and that increases the chances that the motorist will unerringly bring the used oil to an authorized collection facility. Four types of kit are shown, each with its own advantages, but with many features in common. Each provides a closeable container of new oil, a collector for used oil, and a convenient system for either closing the container used for collecting the used oil, or for transferring the used oil from the collector to the emptied closeable container in which the new oil had been contained.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings:

FIG. 5 is a front elevation view of an assembled third embodiment of a motor oil change kit provided in accordance with principles of the present invention;

FIG. 6 is a fragmentary exploded perspective view thereof;

FIG. 7 is a sectional view on line 7—7 of FIG. 5;

FIG. 8 is a sectional view of the drain pan after disassembly of the kit of FIGS. 5-7, at a stage where used oil is being drained into the drain pan; and FIG. 9 is an elevation view with parts broken away and sectioned, showing the step of draining the used oil from the drain pan, into the emptied, recloseable container that originally had held new oil.

FIG. 10 is a front elevation view of an assembled motor oil change kit according to a fourth embodiment of the present invention; and FIG. 11 is a side elevation view of the kit in use at a stage comparable with FIG. 9, with portions broken away and sectioned to expose internal details.

DETAILED DESCRIPTION OF THE PRESENTLY PREFERRED EMBODIMENTS

Figure 1:
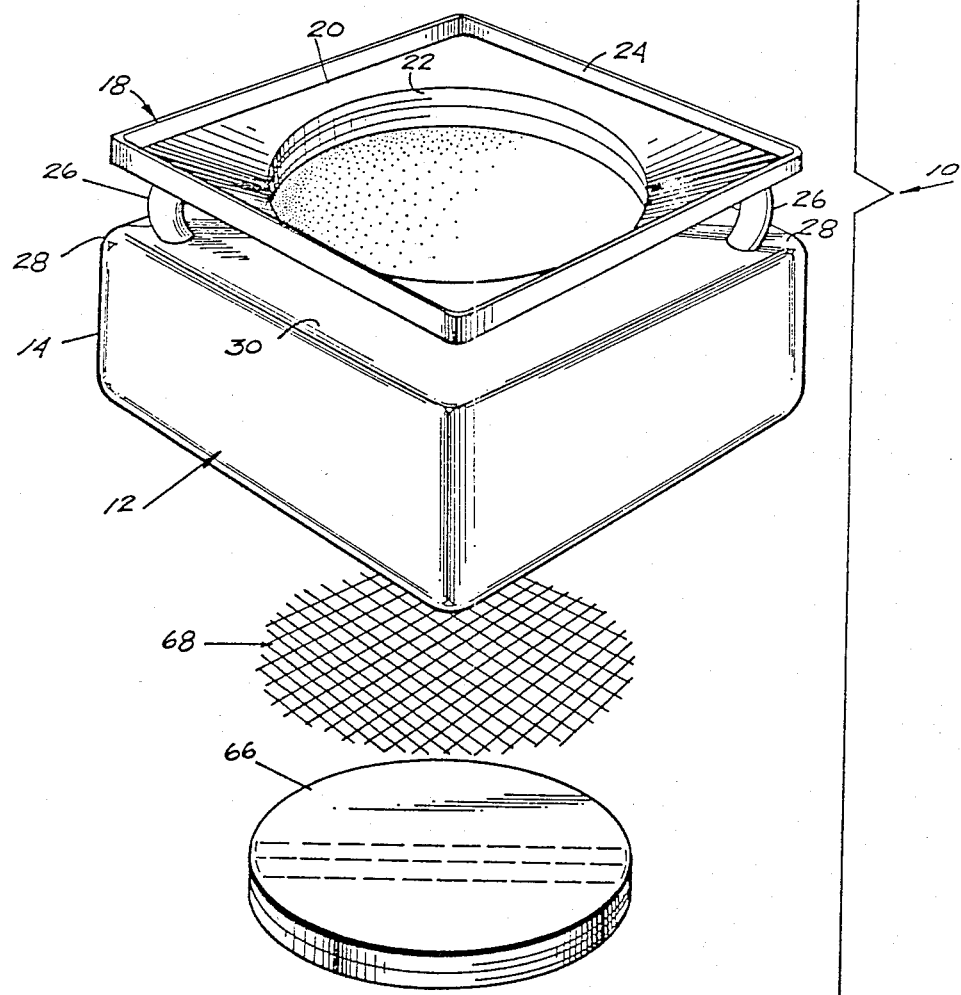
FIG. 1 is an exploded perspective view of a first embodiment of a motor oil change kit provided in accordance with principles of the present invention.
Figure 3:
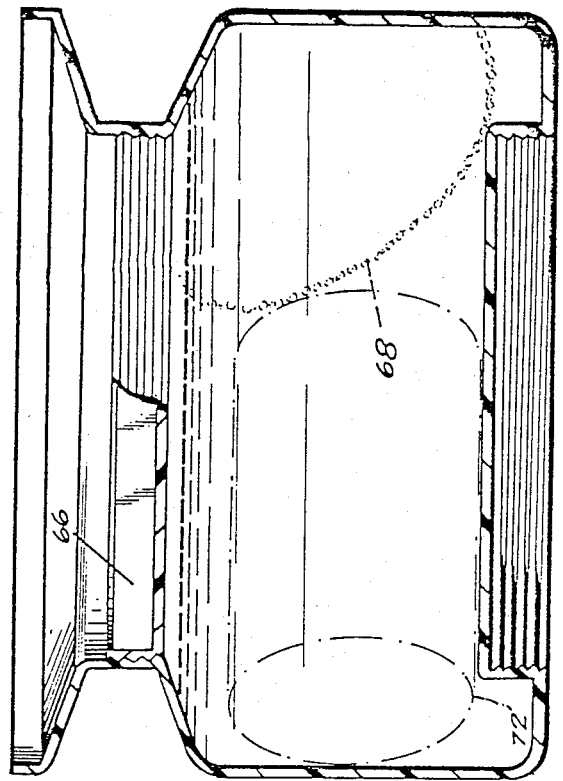
FIG. 3 is a longitudinal sectional view of the used-oil container portion of the first kit embodiment, subsequent to use.
Figure 2:
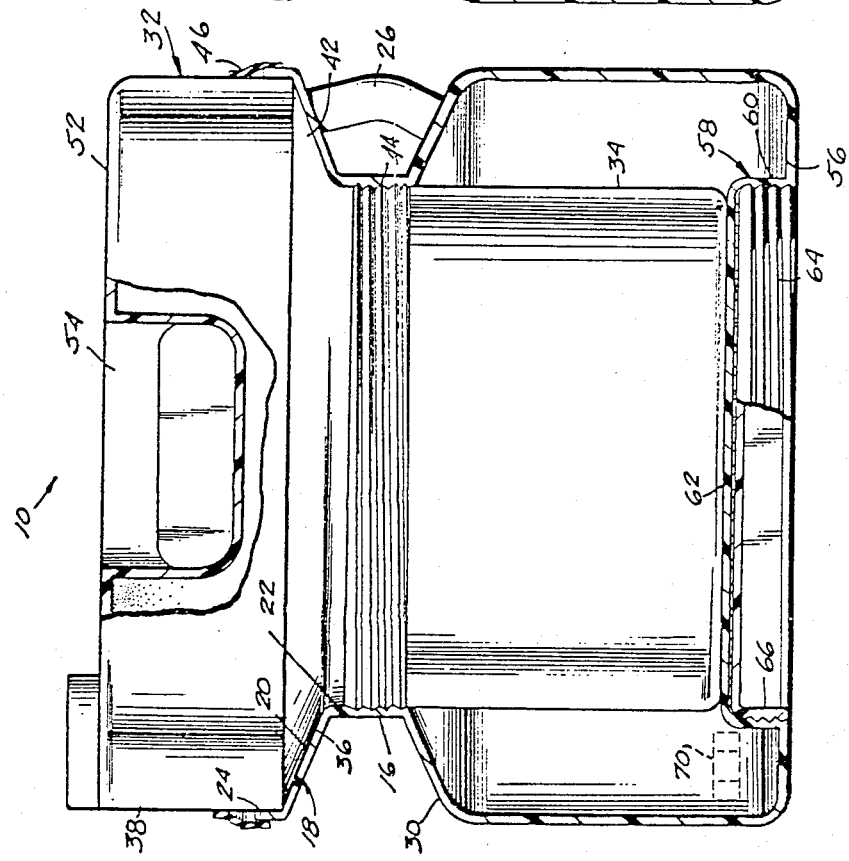
FIG. 2 is a longitudinal sectional view of the first kit embodiment prior to use.

Referring first to FIGS. 1-3, a first embodiment 10 of the motor oil change kit is shown and described. The kit of this embodiment may be thought of as generally resembling a goldfish bowl.

When the DIY purchases the kit 10, it has the form and constituency shown in FIG. 2, with easy instructions for use conveniently printed on the outside. The first step in use of the kit 10 would be to largely disassemble it into its several parts, which are shown in FIG. 1. The kit 10 is seen to include an outer container 12 that will be used by the DIY to collect and contain the used oil. This container is shown having a body 14 being of squat, generally rectangular, but round-cornered, round-edged form, with a vertically short, large diameter tubular neck 16 having an integral flange-like drain pan/funnel member 18 projecting generally radially and somewhat upwardly from the upper end thereof. The floor 20 of the drain pan/funnel member slopes down from its outer periphery to the wide-mouth 22 of the neck 16, and has an upstanding outer perimetrical rim flange 24.

At the corners, where the drain pan/funnel member 18 cantilevers the furthest out from the neck 16, integral supports 26 in the form of arcuate columns are joined between each corner 28 of the top wall 30 of the container body 14, and the underside of the overlyingly corresponding corner of the drain pan floor 20. Each support bows outwards in an imaginary diagonal plane which longitudinally divides the container into halves; two or four of these supports 26 may be provided, and conveniently may be used as carrying handles both for the whole kit 10 and for this container 12.

The kit 10 further includes a jug of new oil 32. Its body is shown having a generally cylindrical, but upwardly slightly flaring lower sidewall portion 34, and a somewhat broader upper sidewall portion of generally rounded-pentagonal plan figure caused by generally rounded-triangular enlargement of the cross-section at 36 to provide a pour spout 38 and by radial enlargement at a diametrically opposite site 40 to provide a tab 42 useful in hand-tipping the jug when putting the new oil in the engine oil supply receiver of the automobile.

The exterior of the sidewall lower portion 34 is at 44 sized to snuggly, frictionally fit in the mouth 22 of the neck 16 of the outer container 12. A screw threaded interconnection may be provided between 44 and 16 if believed necessary or desirable. Often a simple stab fit will suffice, especially when an encircling combination label/tie strap and/or removable adhesive tape or other strapping 46 is used for temporarily maintaining these components of the kit 10 in an associated condition (FIG. 2) until they are intentionally disassociated (FIG. 1).

The jug 32 is shown including a closure cap 48 removably threaded onto the upwardly-opening end 50 of the spout 38. The generally flat upper end wall 52 of the jug 32 is further shown provided with a recessed handle 54 which is used when separating the outer container 12 from the jug 32, and thereafter for carrying the jug 32.

When the full jug 32, as initially, is disposed in the container 12, the majority of the bulk of the jug 32 lies within the body 14, and the lower enlargement surfaces 36, 40 of the jug rest on the floor 20 of the drain pan/funnel member 18.

The bottom wall 56 of the outer container 12 is shown provided with a centrally located, downwardly-opening shallow cylindrical well 58 having a generally cylindrical sidewall 60 and a generally circular upper end wall 62. By preference, and as shown, the well 58 sidewall 60 is internally threaded at 64, so that a relatively large externally threaded, recessed-handled screw-on cover 66 may be threadedly stored in the well 58.

Also provided in an initially stored condition in the well 58, axially between the end wall 62 and the cover 66 is the drain plug-catcher screen 68.

In disassembling the kit 10 for use, the jug of new oil 32 is separated from and taken out of the outer container 12. Further, the screw-on cover 66 and drain plug catcher screen 68 are removed from the storage well 58. Other optional components, such as a wrench 70 for the drain plug, and an oil filter cap wrench which, if provided, would initially be stowed enclosed annular space between the jug of new oil and the outer container are also removed. In use, the catcher screen 68 is mounted in the mouth 22. The container 12 is placed under the crank case oil sump drain by sliding the container 12 laterally under the car and visually lining it up with the car drain pan hole, and then the wrench 70 is used to loosen the drain plug. Should the plug be loosened all the way, and fall out, it would not fall into the container of dirty oil and necessitate a messy retrieval task, but will be saved by the screen 68 acting as a safety net.

Even if the draining oil splashes a little at first, or the container 12 is not positioned quite in the center of where it should be, the draining oil is caught by the drain pan/funnel member 18 and funnelled to the mouth 22, where it drains through the neck 16 and into the body 14 of the container 12.

After the used oil has finished draining into the used container 12, there should be some space still left in the container 12, since it is purposefully given a volume somewhat in excess of that of the jug of new oil 32. At this time the oil pan sump drain plug is reinstalled and/or retightened and the container 12 of used oil is laterally slid from under the automobile.

If the oil filer cartridge is being changed, the old one is removed and replaced by a new one, and the old one 72, may be placed in the container 12, provided the screen 68 is first simply removed. The screen 68 may also be disposed of by doubling it over and dropping it through the mouth 22 and into the collected used oil. After everything that is going into the used oil container is in there, the cover 66 is screwed tightly into the neck 16 thus closing the container 12, which is then ready (as shown in FIG. 3) to be dropped-off at the type of recycling center which permits approved containers of used oil to be simply left there. The container of new oil 32 is poured into the oil supply reservoir filler spout of the automobile, whereupon the empty jug 32 may be recapped and simply discarded, unless returnable at the used-oil collection facility.

A second embodiment of the motor oil change kit is shown at 80 in FIG. 8. In this version, the kit loosely resembles a turkey roaster, and is especially suited for economical use in conjunction with a used oil collection facility which requires the DIY to empty out, and to not leave behind, the container in which used oil is brought to the used oil collection facillity.

The kit 80 is seen to include an outer container 82 having a pan-like body 84 and a lid 86, and a container jug of new oil 88. The body 84 generally resembles the body of a turkey roasting pan, in having an end wall (or floor) 90, a perimetrical sidewall 92 provided with one or more carrying handles 94 and a lip 96 at the free edge of the sidewall 92. The handle or handles 94 are oriented and spaced to encourage the user to carry the kit 80 in the desired orientation. Thus the kit 80 may be carried upright by one handle like a milk jug, when first purchased, but after use, the outer container 82 is preferably would be carried with its end wall 90 down, in turkey roaster orientation.

The lid 86 is generally flat, but has a groove 98 provided about the perimeter of its inner face. The lip 96 and groove 98 are meant to be removably sealingly frictionally interdigitated much in the manner of the well-known Tupperware ® containers of Dart & Kraft, Inc. The lid when sealed to outer container is designed to render the container leakproof.

The external size and shape of the jug 88 is generally the same as the comparable characteristics of the volume of the space 100 enclosed by the outer container 82, so that when the jug 88 is contained in the outer container 82, it cannot shift around in there to any significant extent. For merchandising purposes, and, if needed or desired, to help hold the container 82 in a closed condition, the kit 80, as sold to the DIY/consumer may have a label, wrapper, encircling band or the like 102 applied thereto, which may bear advertising, discount coupons, instructions for use, etc.

Upon purchasing the kit 80, the DIY/consumer would remove or break the label 102 (to the extent it were in the way of disassembly of the kit), remove the lid 86 and take out the jug of new oil 88. By preference, the profile of the jug of new oil is formed with a plurality of laterally extending, outwardly opening grooves 104, both as the container jug 88 of new oil is packaged in the outer container and as the consumer removes the jug from the outer container 82 during kit disassembly, the grooves 104 act as air vents to channel air out of and into the space in the container 82 which lies back of the jug 88. This makes it easier to assemble and disassemble the kit, and in the preferred embodiment is needed because the sidewall of the outer container 82 otherwise so closely follows the top, bottom, left and right perimeter walls of the jug 88.

The jug 88 is shown further including an exteriorly threaded, upwardly projecting tubular neck 106 at the top, the mouth of which is closed by a removable, threaded closure cap 108. The sidewall of the outer container 82 is, at the comparable site, molded so as to have a well 110 in which the capped neck of the jug is received in the assembled kit. The well 110 is only as deep as the neck, but extends to the free edge of the sidewall 92 and thus bears its respective segment of the lip 96. The lid 86 has a corresponding appendage 112 which bears its respective segment of the groove 98.

The jug 88 may be girdled by a label 114 which fits in a corresponding shallow, broad circumferential recess 116.

Finally, the bottom wall 118 of the jug 88 is shown provided at a site diagonally opposite the spout 106 with a finger-grip recess 120 to aid the DIY in pouring the new oil into the engine, and the top wall 122 is shown provided with a recessed handle 124.

Once the kit 80 has been disassembled, the DIY places the pan-like body 84 under the automobile oil pan drain plug location, in upwardly-open "dishpan" orientation and loosens the drain plug, allowing the old, dirty oil to drain into the pan-like body 84. Then the drain plug may be retightened and the pan-like body 84 slid from under the automobile and tightly recovered, in the same fashion as the Tupperware container, using the lid 86. Usually it would be best to leave the covered container 82 of old, dirty oil in "dishpan" orientation for transport to the used oil collection facility, although the sealing and securement ability that is state of the art in this field could permit the container 82 to be set up on end and carried by the handle 94 with little worry that the lid 86 would come away from the container body and permit leakage.

The new oil would be introduced into the oil filler mouth of the engine by removing the cap 108, and using the handles 120, 124 to hold and tip-up the jug as the new oil is poured out of it into the oil filler mouth. When the jug 88 is empty, it may be recapped and discarded, or saved for some other use.

Figure 4:
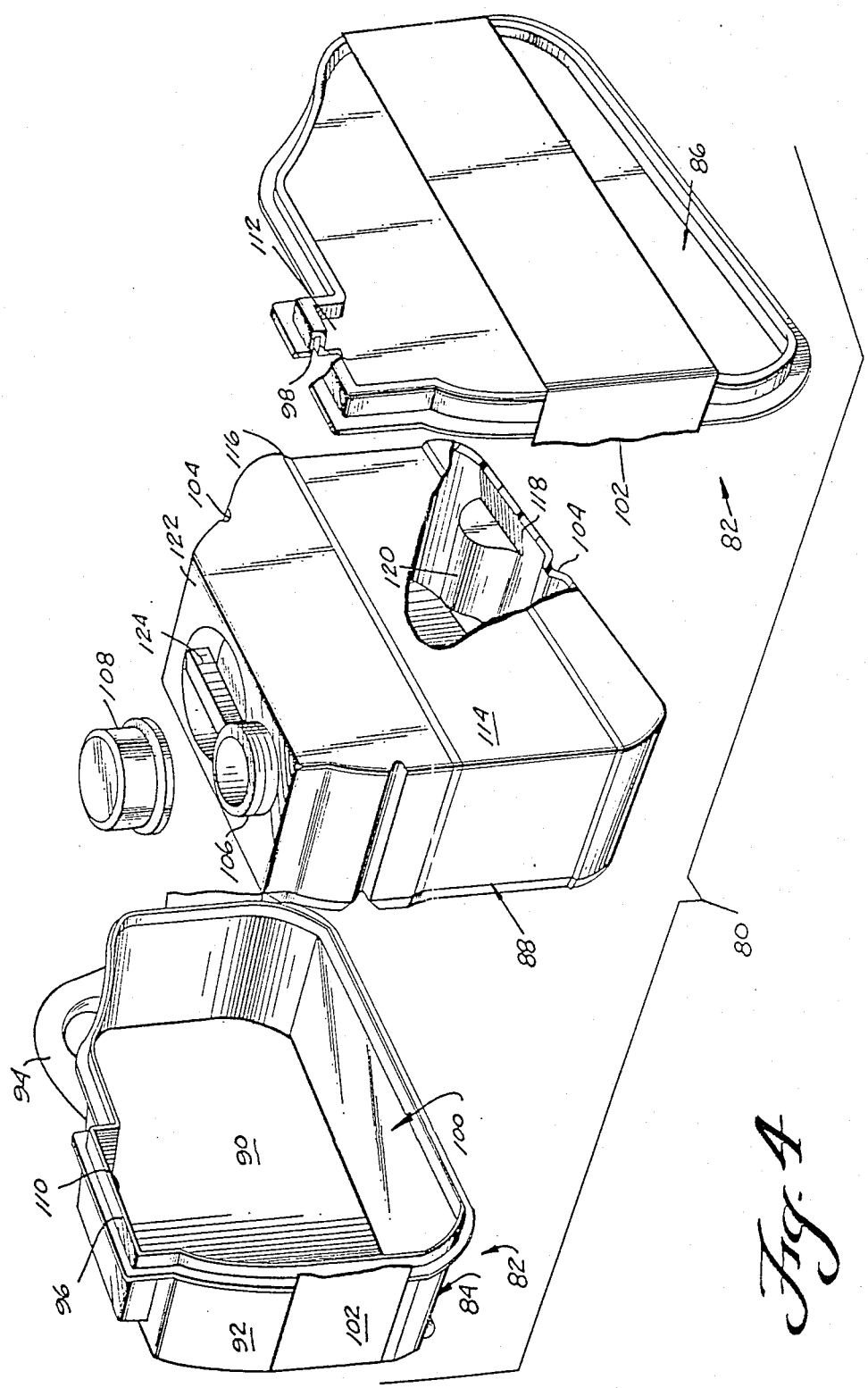
FIG. 4 is an exploded perspective view of a second embodiment of a motor oil change kit provided in accordance with principles of the present invention.

A third embodiment of the motor oil change kit is shown at 130 in FIGS. 5–9. The kit of this embodiment may have most of its features in common with those of the kit of FIG. 4. Accordingly, some corresponding features are given like numerals, with primes, and are not re-described here. (Although the outer container 82' is shown provided with a lid 86', with the lip and groove 96' and 98' form of closure and seal, the lid, lip and groove may be omitted, and a label 102' and/or overwrap (not shown) depended-upon to initially hold the kit 130 in an assembled condition.)

Upon purchasing the kit 130, the DIY would disassemble it by breaking open and/or removing the label 102' and/or overwrap and sliding the jug of new oil 88' out of the pan-like outer container body 84'. Next, the DIY would threadedly remove the closure cap 108' from the jug of new oil.

This cap 108' is seen to be of a somewhat unusual design, in that besides having the usual end wall 132 and threaded peripheral skirt 134, the cap 108' has an inner structure 136. The latter is shown including a rod 138 coaxially secured at one end on the inner face of the cap end wall 132, and having an externally threaded plug 140 coaxially provided on its opposite end. In a sense, this construction resembles the combined dauber and cap that is to be conventionally found on bottles of liquid shoe polish and similar products.

The end wall or floor 90' of the pan-like container body 84' is provided with an internally threaded opening 142, the location of which is suggested in FIG. 5. The plug 140 is then threaded into the opening 142 from inside the body 84' to sealingly close the opening 142, leaving the rod 138 to project upwards through the depth of the body 84'. At this stage, the cap 108' remains securely perched atop the rod 138 to be available for later use as a handle. The pan-like container body 84', with the plug 140 installed as just described, and disposed in "turkey roaster" orientation, is slid under the automobile and lined-up under the drain plug D of the oil pan. The drain plug D is loosened and the dirty, used oil is permitted to drain into the body 84'. When the used oil has finished draining from the automobile, the drain plug D is retightened and the container 84', now full of used oil, is slid from under the automobile. At this stage, the cap 198' looks like a lily pad projected slightly above a "lake" of dirty oil in the container 84'.

The next step is to pour the new oil from the jug 88' into the filler mouth of the engine. When the jug 88' has thus been emptied, a second closure cap 144 which is provided on a laterally projecting exteriorly threaded neck 146 on the jug 88' is removed and threaded onto the neck 106' (from which the cap 108', earlier was removed). The jug 88' is then laid down on its opposite side face 148 from the face 150 on which the neck 146 is provided. Thus, the open neck 146 now projects vertically upwardly.

Next, the full container 84' of used oil is carefully lifted, still in its "turkey roaster" orientation, and set down on the recumbent jug 88'. In order to facilitate correct performance of this step, the container and jug are provided with one or more pairs of alignment arrows or the like 152. Further, in order to properly support the container 84' upon the recumbent jug 88' so that the used oil may be transferred by gravity from the container 84' to the recumbent jug 88', the container and jug may be provided with correspondingly tapering profiles as shown, and/or the container 84' with feet 154, much in the way that the feet and sloping bottom wall of a footed bathtub make the drain opening the lowest point of the tub. As shown, at least two feet 154 are provided. These are spaced from one another and both of them are spaced from the outlet neck 142 in the floor of the container, and each is shown shaped to conform to a corresponding portion on the "top" of the jug 88', distally of the neck 146 of the jug 88', assuming the jug 88' to have the recumbent orientation which it is shown having in FIG. 9.

When the container 84' full of used oil is properly aligned and supported upon the recumbent jug 88', the neck 142 in the floor of the container 84' projects into the neck 146 of the recumbent jug 88', and the container 84' is supported on the jug 88' at sites 154 and 154, remotely of the telescopically related necks 142 and 146 whereupon the cap 108' may be turned. This unscrews the plug 140 from the neck 142, allowing the dirty, used oil to drain from the pan-like container body 84' in which it was collected, into the recloseable jug 88'. After this transfer operation has been completed, the container 84' is lifted off the jug 88', and the cap 108' is threaded onto the neck 146, thus sealingly reclosing the jug 88'.

The caps 108' and 144 preferably are provided with distinctive colors and/or indicia, such as "A" and "B". Because in conducting the oil change the locations of the two caps are interchanged, one may, by visual inspection easily ascertain whether the container 88' holds new oil or used oil. The container 88' now reclosed and full of used oil may be taken to either type of oil recycling center—either one where the whole jug may be simply dropped-off or, one where the contents must be poured into a collection drum and the empty jug taken from the premises and re-used in an almost like manner with the saved container 84. For additional future oil changes only 1 quart cans of new oil need be purchased for subsequent oil changes.

A fourth embodiment of the motor oil change kit is shown at 160 in FIGS. 10 and 11. Although many of the parts in this embodiment are shaped differently than in the third embodiment, the structures and functions are mainly equivalent, thus equivalent features are given like numbers, but an added prime in FIGS. 10 and 11, compared to their usage in FIGS. 5–9.

The most striking difference embodied in the kit 106 is its appearance; it is provided with the resemblance of a space shuttle-type rocket ship/airplane to suggest its utility as a means for "shuttling" new oil to the automobile and used oil to the used oil collection facility. What is significant about this kit is its jug 88'' in that it can on-load new oil at the refinery, off-load new oil into vehicle crankcase, on-load used oil from the container 84'' and off-load the used oil at the recycle collection center, all by the single jug opening. The jug of new oil 88'' has a recessed handle 162 in its front face 150' rather than at the top. The lateral neck 146' of the jug of new oil is so near the top that there is no need for the top neck or for a plain closure cap. Rather, the neck 146' is originally provided with the dauber plug-type cap 108'' and is used both for pouring out the new oil and draining in the used oil from the outer container 84''. Jug stabilizer fins 164 may be integrally provided in the container 84'' to the extent it is oversize relative to the jug of new oil 88'', in order to make the latter fit acceptably snuggly in the former.

In use, the kit 160 is purchased in assembled form as shown in FIG. 10. First it is disassembled by tearing the label or overwrap so that the container of the new oil 88'' may be removed from the outer container 84''. The outer container 84'' is then laid-over on its end wall 90''. While the jug 88'' remains upright, its cap 198'' is removed and the plug 140' thereof is threaded into the opening 142' in the wall 90''. The outer container 84'', with its floor drain thus stoppered, is slid, still in "turkey roaster" orientation under the automobile. The used oil is drained into this container and the drain plug of the automobile is retightened. The pan 84'' of the used oil is then slid out from under the automobile. The jug 88'' of the new oil is lifted and tilted using the recessed handle 162 and the finger grip recess 120'' to pour the new oil into the filler tube of the automobile engine.

When the jug 88'' is empty, it is laid down on its side, with the face 148' down and the face 150' up. As with the third embodiment, the pan 84'' is then aligned and set on the recumbent empty jug 88'' and the cap 108'' is turned to remove the plug 140', thus allowing the waste oil to transfer by gravity from the collecting pan 84'' to the jug 88''. When this transferring step is complete, the empty collecting plan 84'' is lifted off the recumbent jug 88'', and the cap 108'' is reinstalled on the jug 88'' to close it up and seal in the waste oil. Lastly, the waste oil in the jug 88'' may be shuttled back to the oil recycle collection facility as explained above.

Preferably, the inner and outer containers of all embodiments are molded of the same kinds of plastic materials, and using the same techniques, as presently are used to make motor oil containers, bleach bottles, milk bottles, Tupperware containers and the like. In each instance, both the inner and outer containers are capable of standing alone, without need for being contained in a box or the like.

While most cars require 5 quarts of new oil, present Cadillac diesel engines take 6 quarts and Volvo engines require 7 quarts. To cover all cars the jug and pan size offered with the kits could be made to hold up to 7 quarts for the dirty oil. For the new oil the jug(s) could be filled with only 5 quarts; a Volvo owner would have to buy 2 additional 1-quart cans of new oil at the time he or she purchases a kit, thus meeting his 7-quart requirement, for both his or her new and used motor oil.

Except for the new oil, all four of the kit embodiments are reuseable. Any of the kits need only be purchased once, and by saving the kit parts the DIY need only purchase new oil in 1-quart cans or the like for subsequent oil changes.

The kit in any of its embodiments optionally can include any or all of the following:

a. A plastic pour spout that snaps onto the pour mouth neck of all jugs for pouring new oil into vehicle crankcase, thus eliminating the need for a funnel.

b. A bar-type wrench containing 5 different sized openings for unscrewing drain plugs from vehicle oil pans and retightening the same.

c. A cap wrench for unscrewing the used oil filter from the vehicle crankcase.

It should now be apparent that the motor oil change kit as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A do-it-yourselfer's oil catch pan, for use with a jug of new oil sufficient to fill or at least substantially fill the engine oil reservoir of a pre-selected motor vehicle to its proper level, in an instance where the jug has an opening provided with an openable and closable closure cap, said oil catch pan, comprising:

a self-supporting container sized and configured to be slid on the ground to a position under a motor vehicle crankcase and having a bottom wall and a peripheral sidewall with a top opening for receiving used oil drained from the crankcase;

said bottom wall of said container having means providing at least one seating surface thereon, each such seating surface being cooperable with said jug for enabling the oil catch pan to be seated on the jug in overlying relation thereto when the jug is upright, uncapped and has been emptied of new oil;

said bottom wall of said container having means defining an oil drain aperture formed therethrough;

said bottom wall sloping downwards toward said oil drain aperture;

at least one said seating surface being located distally of said oil drain aperture and being constructed and arranged to be supported upon a corresponding top portion of the jug distally of said opening of said jug;

a closure member for said oil drain aperture, said closure member being selectively and removably positionable in obstructing relation to said oil drain aperture to block flow of used oil through said oil drain aperture;

said oil drain aperture being constructed and arranged to register with said opening in the jug when the oil catch pan is seated on the jug in overlying relation thereto with the jug in an upright, uncapped, emptied of new oil disposition, for enabling used oil which has been drained into the oil catch pan from the preselected motor vehicle through said top opening to be transferred from the oil catch pan to the jug upon manipulation of said closure member to unblock said oil drain aperture, thereby making it unnecessary to pour the used oil out of the oil catch pan through said top opening by tilting or tipping the oil catch pan, so that the used oil may be drained from the oil catch pan into the jug and the jug re-capped for transporting the used oil to a disposal site without spillage;

said removing member being a gripping member which is constructed and arranged to extend to a level which lies above the level of the used oil in the oil catch pan; and said gripping member comprising a cap constructed and arranged to openably and reclosably cap the jug, and a rod securing that cap to said closure member.

2. The oil catch pan of claim 1, wherein:

said container bottom wall is threaded peripherally of said oil drain aperture and said closure member is complementarily threaded for openably blocking said oil drain aperture.

3. The do-it-yourselfer's oil catch pan of claim 1, wherein:

said at least one seating surface comprises at least two such seating surfaces, these seating surfaces being spaced substantially apart from one another, both of said seating surfaces being located distally of said oil drain aperture and constructed and arranged to be supported upon corresponding top portions of the jug distally of said opening of said jug.

4. A motor oil change kit, comprising:

a first self-supporting container in the form of a jug constructed and arranged for storing a quantum of new oil sufficient to fill or at least substantially fill the engine oil reservoir of a preselected motor vehicle to its proper level;

said first container having wall means defining an enclosed volume of space sized to receive at least said quantum of new oil, means defining an openable and closable opening through said wall means and into said space, and cap means for said opening;

a second self-supporting container in the form of an oil catch pan sized and configured to be slid on the ground to a position under said engine oil reservoir;

said second container having wall means defining a bottom wall and a peripheral sidewall bounding a top opening of an oil-receiving storage space constructed and arranged to receive used oil draining from said engine oil reservoir;

said first container being compactly received and releasably confined in kit form in said used oil-receiving storage space of said second container at a stowed position in which it is peripherally surrounded by a sidewall formation of said peripheral sidewall of said wall means of said second container;

said first container, when in said position, being removable from said second container through said top opening of said second container;

said bottom wall of said second container having means providing at least one seating surface thereon, each such seating surface being cooperable with said first container for enabling said second container to be seated on said first container in overlying relation thereto when said first container is upright, uncapped and has been emptied of new oil;

said bottom wall having means defining an oil drain aperture formed therethrough;

said bottom wall sloping downwards toward said oil drain aperture;

at least one said seating surface being located distally of said oil drain aperture and being constructed and arranged to be supported upon a corresponding top portion of said first container distally of said opening of said first container;

a closure member for said oil drain aperture, said closure member being selectively and removably positionable in obstructing relation to said oil drain aperture to block flow of used oil through said oil drain aperture;

said oil drain aperture being constructed and arranged to register with said opening in said first container when said second container is seated on said first container in overlying relation thereto with said first container upright, uncapped and empty of new oil, for enabling used oil which has been drained into said second container from said engine oil reservoir through said top opening to be transferred from said second container to said first container upon manipulation of said closure member to unblock said oil drain aperture, thereby making it unnecessary to pour the used oil out of said container through said top opening by tilting or tipping the oil catch pan, so that the used oil may be drained from said second container into said first container and said first container re-capped by said cap means for transporting the used oil to a disposal site without spillage.

5. The motor oil change kit according to claim 4, wherein:

said first container is in the form of a jug having a gripping handle, and said first and second containers are semirigid.

6. The motor oil change kit according to claim 4, wherein:

said opening in said first container is disposed in the vicinity of a top end of the first container and is constructed and arranged to be used for pouring the new oil out of the first container.

7. The motor oil change kit according to claim 4, wherein:

said opening in said first container is formed through a side wall of the first container and opens upwardly when the first container is rested on a respective opposing side wall thereof; and wherein:

said first container has means providing a further opening in the vicinity of a top end thereof for pouring the new oil out of the first container.

8. The motor oil change kit according to claim 4, further including:

said closure member being fixed to a gripping member lying above the level of the used oil in the oil catch pan to enable the closure member to be removed without requiring the user to dip his or her fingers into the used oil.

9. A motor oil change kit, comprising:

a first self-supporting molded plastic container storing a quantum of new oil sufficient to fill or at least substantially fill the engine oil reservoir of a preselected motor vehicle to its proper level; and a second self-supporting molded plastic container in the form of an oil catch pan sized and configured to fit under a motor vehicle crankcase and having a top opening for receiving used oil drained from the crankcase;

the first container being compactly received and releasably confined in kit form in a used oil-receiving storage space of said second container at a stowed position in which it is peripherally surrounded by a side wall formation of the second container;

said first container being removable through the top opening of said second container;

a preselected one of said first and second containers being constructed and arranged to provide for storage therein of the removed quantity of used oil without requiring such used oil to be poured out through the top opening of said oil catch pan in order to store the used oil; and said preselected one of said first and second containers being completely sealable without requiring the use of the other of said first and second containers, for transporting the used oil to a disposal site without spillage;

said preselected one of said container being said first container;

the bottom wall of the oil catch pan and a preselected wall portion of said first container have means providing cooperating seating surfaces thereon for enabling the oil catch pan to be seated on said first container in overlying relation thereto when the first container is oriented in a preselected position;

an oil drain aperture being formed through the bottom wall of the oil catch pan, said oil drain aperture being constructed and arranged to register with an opening in said first container when said catch pan is seated on said first container, for enabling the used oil in said catch pan to be transferred to said first container, thereby making it unnecessary to pour the used oil out of the oil catch pan by tilting or tipping the oil catch pan;

a closure member unit having first and second closure members fixed to and disposed at opposite ends of an elongated member, said closure member unit being stowed in a position on said first container in which said first closure member blocks liquid flow through a preselected opening in said first container, said closure member unit being manually removable from said first container and removably positionable on said oil catch pan at a position where said second closure member blocks flow of used oil through said oil drain aperture, and said unit being manually removable from said oil catch pan to permit used oil in said oil catch pan to be transferred to said first container upon seating the oil catch pan on said first container.

10. The motor oil change kit according to claim 9, wherein:

said elongated member is of sufficient length to dispose said first closure member above the level of used oil drained into said catch pan to enable the closure member unit to be manually removed from said oil catch pan for draining the used oil through said oil drain aperture without requiring the user to dip his or her fingers into the used oil in said pan.

11. The motor oil change kit according to claim 9, wherein:

said oil drain aperture is internally-threaded, said second closure member is an exteriorly-threaded plug adapted to be threaded into the oil drain aperture, said first closure member is an interiorly-threaded, recloseable cap adapted to be threaded into an exteriorly-threaded neck of said first container.

12. The motor oil change kit according to claim 9, wherein:

said preselected opening in said first container is the opening through which the used oil is drained from the oil catch pan into the first container and is located in the vicinity of the top end of the first container for use in pouring the new oil out of the first container;

said closure member unit is repositionable on said first container after the used oil is drained into said first container to block said opening in said first container and thereby seal said first container to prevent spillage of the used oil from said first container.

13. The motor oil change kit according to claim 9, wherein:

said preselected opening in said first container is separate from the opening through which the used oil is transferred into the first container and is in the vicinity of the top end of the first container for use in pouring the new oil out of the first container.

14. A motor oil change kit, comprising:

a first self-supporting molded plastic container storing a quantum of new oil sufficient to fill or at least substantially fill the engine oil reservoir of a preselected motor vehicle to its proper level; and a second self-supporting molded plastic container in the form of an oil catch pan sized and configured to fit under a motor vehicle crankcase and having a top opening for receiving used oil drained from the crankcase;

the first container being compactly received and releasably confined in kit form in a used oil-receiving storage space of said second container at a stowed position in which it is peripherally surrounded by a side wall formation of the second container;

said first container being removable through the top opening of said second container;

a preselected one of said first and second containers being constructed and arranged to provide for storage therein of the removed quantity of used oil without requiring such used oil to be poured out through the top opening of said oil catch pan in order to store the used oil; and said preselected one of said first and second containers being completely sealable without requiring the use of the other of said first and second container, for transporting the used oil to a disposal site without spillage;

when said first container is in its stowed position in said second container, the long axis of said first container extending through the top opening of said second container and intersecting the bottom wall of said second container;

the top opening of said second container being defined by an internally threaded neck; and the first container having an externally threaded portion which is threaded into said neck to stow the first container in said second container.

15. The motor oil change kit according to claim 14, further including:

an externally threaded plug which is threaded, when in a stowed position, into an outwardly opening recess in the bottom wall of said second container;

said threaded plug being constructed and arranged to be manually removed from said recess and threaded into said neck of said second container after the used oil is drained into the second container to block said top opening and thereby prevent spillage of the used oil from said second container.

* * * * *